3,677,970
HYDROGENATION OF ORGANIC COMPOUNDS
Joseph K. Mertzweiller and Horace M. Tenney, Baton Rouge, La., assignors to Esso Research and Engineering Company
No Drawing. Continuation-in-part of application Ser. No. 674,097, Oct. 10, 1967. This application Jan. 7, 1970, Ser. No. 1,282
Int. Cl. C07c 5/02
U.S. Cl. 252—431        21 Claims

ABSTRACT OF THE DISCLOSURE

Novel hydrogenation catalyst are formed by impregnating a suitable support material with an aqueous solution of a salt of a transition metal; heat-treating the impregnated support at a temperature above 500° F. to form chemical complexes on the surface of the support and to drive off moisture and absorbed oxygen; activating the surface complex by contacting the impregnated support with a soluble organometallic compound wherein the metal constituent is selected from Groups I, II and III of the Periodic Chart of the Elements; treating the activated support material in the presence of hydrogen at a temperature of at least 300° F., and thereafter reacting the hydrogen treated activated support material with hydrogen sulfide. The so-formed novel supported sulfided catalysts are highly active for the hydrogenation of organic feedstocks containing relatively high concentration of sulfur in the feedstocks.

CROSS-REFERENCE TO RELATED APPLICATION

This application is a continuation-in-part of U.S. Ser. No. 674,097, filed Oct. 10, 1967, now abandoned.

BACKGROUND OF THE INVENTION

This invention relates to a new and useful process for the preparation of high activity catalysts suitable for reactions between hydrogen and hydrocarbons and particularly for the hydrogenation, or hydrogen addition, to organic compounds containing nitrile groups, carbonyl groups, aromatic, acetylenic or olefinic linkages. It is also concerned with the novel catalysts so produced, as well as the processes for using these catalysts.

More particularly, this invention relates to impregnating a suitable support, as hereinafter defined, with a transition metal, treating the supported catalyst with an organometallic compound under conditions to effect a chemical bonding of said metals to the support and thereafter reacting said catalyst with hydrogen sulfide to render the catalyst impervious to subsequent deactivation by sulfur. Specifically, this invention relates to impregnating a suitable support material with a transition metal; heat-treating the impregnated support at a temperature of at least 500° F. to drive off moisture and absorbed oxygen; activating the surface complex with an organometallic compound, treating the activated species in the presence of hydrogen under narrowly defined conditions and thereafter reacting said hydrogen treated activated support material with hydrogen sulfide.

DESCRIPTION OF THE PRIOR ART

Various heavy metals, especially transition metals, have been previously described as useful for conducting catalytic reactions. Hydrogenation catalysts have included solid metals, slurries of metals, and metals dispersed on supports. Solid metal catalyst had been prepared by contacting oxides of the desired metal with reducing gases, e.g., carbon monoxide, or hydrogen, or both. Slurries suitable as catalyst have been prepared by contacting anhydrous solutions of organometallic compounds of the desired metal with organoaluminum compounds, these being brought together to form slurried catalysts. Metals have been provided on supports by impregnation of support with anhydrous solutions of the salts of the desired metal, this being found by reduction of the salts to produce deposition of metallic metal.

In Canadian Pat. 697,780, which issued Nov. 10, 1964, methods are described for improving the activity of cobalt and for converting certain inactive metals, i.e., manganese and molybdenum, into active hydrogenation catalysts. In typical reactions, slurried catalytic mixtures are produced by forming anhydrous solutions of soaps of the desired metal, and the desired organometallic reducing agent, and then contacting the two solutions together to form catalytic reaction mixtures. In accordance with one of the methods, a support is impregnated by contact with anhydrous or nonaqueous solution of a soap of the desired metal, and with an organometallic reducing agent, such as organoaluminum compounds, to produce a loosely supported reaction product mixture of dispersed metals. In other techniques, supports are impregnated with soaps of the desired metal, and the support then contacted with a solution of the organometallic reducing agent to produce supported catalytic mixtures.

While these catalysts are moderately active hydrogenation catalysts, there are nonetheless a number of disadvantages associated with their use. For one thing, the materials, in all the phases of their use are highly pyrophoric and the slurries must be formed in an oxygen-free atomsphere. Also, the catalytic materials formed are highly pyrophoric. Thus, the catalytic product of the reaction is an insoluble pyrophoric solid which is highly reactive whether in slurry or supported form. Moreover, the material used in forming the catalysts are quite expensive, to say nothing of the cost involved, due to the extra precautions which must be taken in handling the materials. Furthermore, the organic solvents which are used are highly flammable.

In U.S. Pat. 3,415,759 there is disclosed a method for preparing a hydrogenation catalyst by depositing cobalt carboxylate on a diatomaceous earth support and heating the supported cobalt carboxylate at a temperature between about 135 and 160° C. and thereafter reacting the thus heat-treated product with an aluminum alkyl. However, when temperatures materially above about 160° C. are employed to dry the catalysts, the catalyst becomes progressively deactivated, particularly insofar as the hydrogenation of high molecular weight compounds are concerned.

In our copending application Ser. No. 880,933 filed Nov. 28, 1969 which application is a continuation-in-part of U.S. Ser. No. 674,098, filed Oct. 10, 1967, now abandoned, new and improved hydrogenation catalysts employable in heterogeneous liquid and gas phase reaction systems are described. These catalysts are very highly active for the hydrogenation or organic compounds under very mild conditions of temperature and pressure; even ambient conditions. While these catalysts have proven quite useful in various hydrogenation reactions, they have left something to be desired in the processing of high sulfur content feeds. In processing non-sulfur containing feeds, hydrogenation reactions have been conducted smoothly and efficiently for periods of long duration. In processing sulfur-containing feeds, however, the activity of the catalysts have declined very rapidly. The sulfur acts as a poison, rapidly deactivating the catalysts.

It is, accordingly, an objective of the present invention to obviate these and other problems. In particular, it is an objective of this invention to provide novel supported catalysts employable in heterogeneous liquid and gas phase reaction systems, these being highly active for the hydrogenation of organic compounds, including especially those containing aromatic or olefinic linkages, even under very mild conditions of temperature and pressure, and the presence of sulfur. More particularly, it is an object to provide easy to handle catalysts for use in a wide variety of processes, including selective hydrogenation, dehydrogenation, isomerization, hydrodesulfurization, hydrodenitrogenation, hydrocracking and hydrogen transfer. An even further object is to provide an efficient process for forming high activity catalysts, the process utilizing relatively cheap, readily available forms of metal salts applicable in aqueous media.

The present invention is based on the discovery that catalysts formed pursuant to steps described in our copending application, Ser. No. 880,933 can be further treated with hydrogen sulfide, at low temperature, to render them impervious to subsequent deactivation by sulfur. Accordingly, the present hydrogenation catalysts can be used for hydrogenation of suitable feedstocks, even in the presence of large amounts of sulfur.

SUMMARY OF THE INVENTION

It has now been discovered that novel hydrogenation catalysts exhibiting unusually high activity and stability and impervious to subsequent deactivation by sulfur may be prepared by impregnating a suitable support material, as hereinafter defined, with an aqueous solution of a salt of transition metal; heat-treating the impregnated support at a temperature of at least about 500° F. to form chemical complexes on the surface of the support and to drive off moisture and absorbed oxygen; activating the surface complex by contacting the impregnated supports with a soluble organometallic compound wherein the metal constituent is selected from Groups I, II and III of the Periodic Chart of the Elements, treating the activated support material in the presence of hydrogen at a temperature of at least 300° F. and then treating with hydrogen sulfide to further activate and stabilize the catalyst. The present invention is based on the discovery that a highly tenacious chemical bonding can be formed between the surface of certain types of supports and the transition metals and the metallic constituent of the soluble organometallic compound when the metals are applied to the supports under the sequence and critically defined conditions of the instant invention. In the sequence of process steps, a supporting material having a surface area of at least 5 square meters per gram and containing at least 0.1 millimole of hydroxyl groups per gram of support is first impregnated with a water-soluble species of a transition metal, preferably a Group I-B, IV-B, V-B, VI-B, VII-B or Group VIII metal. Water has been found particularly suitable for the application of the Group I-B, IV-B, V-B, VI-B, VII-B or Group VIII metals to the support by contacting or immersing the support in an aqueous solution of a salt of the desired metal. Suitably, the support is impregnated with from about 0.1 to about 20% metal, and preferably from about 2 to about 10% metal, based on the total weight of the deposited metal and support.

The impregnated support is then preconditioned by heating the impregnated support at a temperature of at least about 500° F. in order to drive off moisture and absorbed oxygen from the catalyst surface. The preconditioned catalyst is then activated by contacting the impregnated supports with a soluble organometallic compound wherein the metallic constituent is selected from Group I, II and III of the Periodic Chart of the Elements and wherein the metallic constituent has an atomic number of from 3 to 50. Preferably, the organic constituent of the organometallic compound are alkyl groups, particularly linear alkyl groups having from 1 to about 12 carbon atoms. Only the organometallic compounds of Groups I, II and III which are soluble in hydrocarbon or soluble in or complexed with ethers are suitable for the method of this invention. These are the organometallic species which are characterized by predominantly covalent bonding between the metal and the alkyl and/or hydride groups. The preferred metallic constituent of the organometallic compound is aluminum.

The activated supported material is then treated by heating the activated supported material at a temperature of at least 300° F. in the presence of a gaseous stream containing hydrogen. Preferably, the activated supported material is treated in the presence of hydrogen at a temperature above 800° F. and more preferably at a temperature in the range of from about 800° to about 1200° F. for a period of time in the range of from about 1 to about 100 hours. Surprisingly, it has been found that under these high severity conditions, i.e. treating the activated supported catalyst at a temperature above 800° and up to about 1200° F. in the presence of hydrogen, the activity of these catalysts is not significantly decreased and, in fact, generally increases as the treating severity is increased.

Thereafter, the hydrogen treated activated supported metal complex is treated with hydrogen sulfide or a gaseous stream containing hydrogen sulfide. The so treated catalyst is then ready for use in a suitable reaction system for producing hydrogenation (or dehydrogenation) reactions. These catalysts, especially those formed by use of aqueous solutions of the salts of iron, cobalt and nickel, have proven themselves of exceptionally high activity. Olefins, whether singular or multiple linkage compounds, aliphatic or cyclic, have been readily hydrogenated to paraffins, and aromatic compounds have been saturated to produce the corresponding cycloalkanes. Acetylenic compounds, whether of singular or multiple linkage, or aliphatic or cyclic, can also be hydrogenated. This is to even where the feedstocks utilized in the reactions contained high concentrations of sulfur. And, even after long periods of use, the activity of the catalysts was virtually unimpaired. Further, catalysts formed by impregnation of the support with salts of cobalt and iron in the initial step have proven highly satisfactory despite the normally low activity attributed to cobalt and the even lower activity attributed to iron for producing hydrogenation reactions.

While the exact nature of the mechanism is not known and, though the applicants do not wish to be bound by a specific theory on mechanism, there are certain things which are known to occur in the formation of these catalysts. When a suitable support has been impregnated with a transition metal and heat-treated at a temperature of at least 500° F., there is believed to exist a chemical bonding between the surface of the support and the species of the transition metal. This interaction is believed to occur between the acid sites on the support surface and the transition metal salt. Evidence of such interaction is obtained when, for example, iron is employed as the transition metal and is impregnated on a suitable support and heat-treated at a temperature of 500° F. in accordance with the practice of the instant invention, and examined by Mossbauer spectroscopy. Such an examination reveals that essentially all i.e. 99+% of the iron is in the +3 valence state and the Mossbauer pattern corresponds to no known oxide of iron nor to the iron salt employed in impregnating the suitable supporting material. Consequently, this interaction or chemical bonding between the support and the transition metal is believed to be responsible for the difficulty in reducing such a supported catalyst to metallic iron by treatment with hydrogen. For example, under conditions of 1 atmosphere hydrogen pressure at a temperature of about 1000° F., virtually all the iron is reduced to the +2 valence state, i.e. an inactive catalyst while little or no metallic iron is formed.

However, when the heat-treated impregnated support is treated with an excess of organometallic compound, i.e. $QR_n$ where Q represents a Group I, II or III metal, R represents the organic constituent and wherein $n$ is equal to the valence state of Q, it is believed that the bond between the transition metal M (e.g. iron) and the support is broken with a $QR_{(n-1)}$ fragment becoming bonded to the support and the metal M being alkylated by the other R group. The transition metal alkyl is unstable and stabilizes itself by decomposing to a hydride group plus olefin. These reactions can be visualized as follows:

(1) Support —OH + MX $\xrightarrow{H_2O}$ Support —O—M—O + HX (2) Support —O—M—O— + $QR_n$ ⟶
    Support —O—$QR_{(n-1)}$ + R—M—O—

(3) R—M—O— ⟶ H—M—O— + R⁻ (olefin)

The species R—M—O— and H—M—O— is intended to designate a medium sized crystallite of the transition metal species containing at least one hydride group and not simply one atom of M. A medium size crystallite of M may contain 20 or more atoms of M with its anionic component (e.g. oxygen, halide, etc.). Reactions similar to reactions (2) and (3) occur at other M—O bonds in the crystallites of M now no longer bonded to the support. There results considerably smaller crystallites of M containing hydride groups, e.g.

(4)
$$\begin{matrix} O-M-O-M \\ | \quad\quad | \\ M-O-M-O \end{matrix} + 2QR_n \longrightarrow 2R_{(n-1)}Q-O-M-OMR$$
$$\downarrow$$
$$2R_{(n-1)}Q-O-M-O-M-H + 2R^- \text{ (olefin)}$$

Simultaneously with these reactions involving crystallite size reduction in M there are residual —OH groups on the support which react with $QR_n$ (5) Support —OH+$QR_n$→Support —O—$QR_{(n-1)}$+RH The products of both reactions (4) and (5) contain R groups attached to Q which also has one bond to oxygen or another anionic species. This renders the remaining R groups on Q less reactive for reactions (2) and (4). However, if the temperature is increased substantially (e.g. above 300° F.) these R groups become reactive. The result is (1) further decrease in the crystallite size of M and (2) formation of additional hydride groups of M.

The most interesting and significant reaction of all is the reaction between a small hydride crystallite of M (e.g. the product of reaction (4) with R group from the product of reaction (5) at elevated temperature). This reaction leads to a still smaller hydride crystallite of M strongly chemically bonded to Q which is strongly chemically bonded to the support at the site of an original hydroxyl group.

(6)
$R_{(n-1)}Q-O-M-O-M-H$ + Support —O—Q—$R_{(n-1)}$ ⟶
Support —O—Q—$R_{(n-2)}$—O—M—H + $R_{(n-1)}Q-O-M-R$
$$\downarrow$$
$R_{(n-1)}Q-O-M-H + R^-$ When the reaction is forced to completion at elevated temperatures in the presence of hydrogen, all the Q—R groups (or Q—H groups formed therefrom) are reacted according to the reaction (2), (4), (5) and (6) and if the ratio of M to —OH on the support is optimum, there results an extremely active and stable catalyst. The activity is due to the extremely small crystallites of the M hydride and the stability is due to the strong bonding to the support, reaction (6).

The catalyst is then converted to a sulfur-impervious hydrogenation catalyst by treating the active catalyst species, i.e. Support —O—Q—(O—M—H)₂ with hydrogen sulfide, as can be represented by the following equation:

(7) Support —O—Q(OMH)₂+$H_2S$→
    Support —O—Q(OMSH)₂+$H_2$ and (8) Support —O—Q(OMSH)+$H_2S$→
    Support —O—Q(S—M—S—H)₂+$H_2O$ The important feature to note is that prior to the sulfiding treatment (after treating with the metal alkyl compound and with hydrogen) the transition metal is in a highly active and stable state in view of: (1) the very high dispersion (small crystallite size) and (2) the direct chemical bonding of the small crystallite to the support. Upon converting this species to the sulfur resistant form, these two features are not significantly changed and this is the reason for the highly active sulfided catalyst forms.

The sulfiding step is conducted in vapor phase at a temperature of from about 0° F. to 1,000° F. and more preferably from about 100° F. to 800° F. The sulfiding step is generally carried out by use of a diluted gaseous stream containing hydrogen sulfide, preferably in quantities ranging from about 0.1 to about 20 percent $H_2S$ concentration, and more preferably in quantities ranging from about 1 percent to about 10 percent concentration. Higher concentrations of hydrogen sulfide are not generally desirable due to the practical necessity of removing the heats of reaction. The sulfiding step is highly exothermic in nature. While virtually any sulfur-containing compound, or even elemental sulfur, can be used, e.g., in a hydrogen atmosphere, in forming the desired hydrogen sulfide, it is generally preferred to use $H_2S$ formed externally to the sulfiding zone. Of course, hydrogen sulfide can be formed in gases at higher temperatures, and thence the temperature of the gas reduced to effect the sulfiding step.

Thus, it has been discovered that the highly active supported catalysts described above may be sulfided at temperatures above that which have heretofore been possible. In Ser. No. 674,097, now abandoned, it is disclosed that the sulfiding step must be conducted at a temperature below 250° F. in view of the fact that at higher sulfiding temperatures the activity of the catalyst is greatly diminished and, in fact, virtually destroyed. Now, however, the sulfiding step may be conducted under a much broader temperature range, as described above. This is believed to be due to employing the fixation treatment to form a more highly stable and active catalyst.

In addition, it has further been discovered that upon completing the sulfiding step, the sulfided catalyst may then be further treated with a gaseous stream containing hydrogen, under high temperature conditions, as hereinafter described, in order to remove loosely held sulfide or sulfur compounds from the catalyst. Thus when the sulfided catalyst is further heated in a hydrogen atmosphere, a significant enhancement in hydrogenation activity results. This hydrogen treatment may be carried out at temperatures of 400 to 1200° F. and preferably above 600° F. with a flow of hydrogen passing over the catalyst. This behavior suggests the possibility of an equilibrium of the type Support —O—Q—S—M—S—H+$H_2$ ⇌
    Support —O—Q—S—M—H+$H_2S$ If this is indeed the case, the catalyst will perform better at increased hydrogen partial pressures when the sulfur content of the feed reaches higher levels.

Thus, it is believed that the applicants have discovered a new route to a valuable and novel heterogeneous sulfided catalyst which is believed to involve chemical bonding between the support, transition metal and metallic constituent of the organometallic reducing agent which allows for a highly active catalyst which is stable under high severity conditions and resistant to sulfur deactivation.

The selection of a suitable support material upon which the transition metal is impregnated is an essential feature of the instant invention. Suitable supports are those having a reasonable surface area and a sufficient concentration of hydroxyl groups on the surface, which hydroxyl groups are capable of reacting with an organometallic compound, i.e. $QR_n$ or $QR_nX_n$, where Q represents a Group I, II or III metal, R represents the organic constituent i.e. an alkyl group of the organometallic compound or hydrogen, and wherein X equals a halogen, in order to eliminate the RH species and attach the $QR_{n-1}$ species to support surface through the oxygen atom of the original hydroxyl group. Properties and suitability of supports can be characterized in terms of surface area and their hydroxyl content measured by reaction with an organometallic i.e. $QR_n$ compound in the absence of a transition metal.

Those supports most suited to the instant invention include the oxides of Groups II, III and IV of the Periodic Chart of the Elements which can be prepared with surface areas in excess of 5 square meters per gram and wherein the hydroxyl content of the support is at least 0.1 millimole of hydroxyl groups per gram of support. The oxides of Groups II, III and IV having a surface area in excess of 50 square meters per gram and containing a hydroxyl group content of at least 0.2 millimole of hydroxyl groups per gram of support, determined by reaction of the support with the organometallic compound in the absence of the transition metal are preferred. Aluminum oxide having a surface area of above about 100 square meters per gram and a hydroxyl content of at least 1 millimole per gram is the most preferred supporting material of the instant invention. Additional, nonlimiting examples of suitable supporting materials include magnesium oxide, zinc oxide, titanium oxide, provided they have the necessary surface areas and reactive hydroxyl group content as described above. Any types of supports, while possessing the desired surface area, may or may not have the desired reactive hydroxyl group content. Nevertheless, some such supports, for example, activated carbon, can be enhanced in hydroxyl group content by treatment with air or an air-steam mixture at moderate temperatures, i.e. below about 1000° F. in order to form a suitable support for the catalyst of the instant invention. Other well-known supports, such as silica, have a sufficient surface area but may lack the necessary concentration of reactive hydroxyl groups and are not suitable. Silica-alumina supports, having the necessary hydroxyl group concentrations are effective supports and may also be employed in the practice of the invention.

The supported catalyst of the instant invention may be prepared by any means conventionally used for the preparation of a supported catalyst, e.g. by impregnating the support or by precipitation in the presence of the support or by coprecipitation with the supporting material. Water has been found to be particularly suitable for the application of the transition metal salt to the supporting materials. Preferably, the support is first impregnated with a water-soluble species of the transition metal salt by contacting or immersing the support in an aqueous solution of the salt of the desired metal. Preferably, the support is impregnated with from about 0.1% to about 30% equivalent transition metals; and preferably from about 1% to about 10% equivalent transition metal, based on the total weight of the deposited equivalent metal and support. The optimum concentration of transition metal on the support will depend on the nature of the transition metal and on the surface area and hydroxyl content of the support. For example, when a pure activated alumina having a surface area of about 200 square meters per gram and a hydroxyl content of about 1.2 millimoles per gram is employed as the supporting material, and when iron is employed as the transition metal, the optimum concentration of iron is about 0.6 millimole of iron per gram support. With noble metals, for example much lower concentration in the range of 0.1% to 1% are employed. The optimum concentration for other transition metals which results in the highly active, stable catalysts of the instant invention are not known with exactitude because of the many and varied supports which can be employed herein. Nevertheless, it is believed that one skilled in the art can readily determine these concentrations in view of the fact that they are within the preferred concentration ranges as described above.

The use of water to effect the chemical bonding is particularly important in the impregnation of the supports with salts of the desired transition metal. Even iron has produced an exceptionally active catalyst when applied to the support in the form of salts dissolved in aqueous solution. In fact, catalysts derived from aqueous solutions of iron salts have even proved highly effective for the hydrogenation of aromatic nucleus and carbonyl groups of organic compound, i.e. aldehydes and ketones.

The transition metals which can be employed in the practice of the instant invention include the Group I–B, IV–B, V–B, VI–B, VII–B, and Group VIII metals. Preferably, the transition metals which can be employed in the practice of the instant invention include iron, cobalt, nickel, platinum, tungsten, chromium, vanadium, molybdenum, rhenium, manganese, titanium, zirconium, niobium, palladium, rhodium, copper, silver and gold. The most preferred transition metals include iron, cobalt and nickel, platinum, tungsten, chromium, molybdenum, vanadium, rhenium and copper. Nonlimiting examples of salts which can be employed for the application of these metals to these supports include the halides, sulfates, nitrates, formates, acetates, propionates, molybdate, vanadates, chromates, dichromates, tungstates, manganates, titanates, zirconates, rhenates, perhenates and the like. Water soluble acids such as perrhenic acid may also be employed. These various transition metals described above may be used alone or in combination.

The impregnated support in powder or granular form, is then treated by establishing time-temperature relationships suitable to produce a chemical change on the surface of the support and remove water and absorbed oxygen. Suitably, the impregnated support can be heated in air, in an inert atmosphere or in vacuum, e.g. 20 to 29 inches of vacuum at a temperature of at least about 500° F. preferably 600 to 1500° F. and more preferably from about 600° to about 1000° F. It is a critical feature, in order to form the more highly active and stable catalyst of the instant invention, to heat the impregnated support at a temperature above 500° F. for a period of time in the range of about 0.5 to about 4 hours and preferably from about 1 to 2 hours. While the heat-treatment may be performed in air or an oxygen atmosphere, it must then be followed by a period in an inert atmosphere in order to remove the adsorbed oxygen. In addition to the removal of oxygen and moisture, other important reactions occur during this heat-treatment, as described above, in order to render the transition metal in a form more amenable to the subsequent reaction with the organometallic compounds.

In an alternative embodiment, the impregnation and heat-treating steps can be conducted in multiple stages. For example, the support can be impregnated and then dried or partially dried, at low temperature. The support can then be reimpregnated and again dried or partially dried. The heat treatment per se may be conducted in multiple stages, if desired. The impregnated support, to facilitate handling, can thus be subjected to a first rather mild heat treatment to dry the support and then, in a second step, to a more severe treatment to produce the desired chemical change at the surface of this support. Supported catalysts, such as are supplied by the commercial catalyst manufacturers, e.g. iron, cobalt and/or nickel, alone or in combination with other metals such as molybdenum, tungsten, or the like are also amenable to such treatments to transform them to highly active catalysts.

The then impregnated, heat-treated support is activated by treatment with an organometallic compound, suitably a hydrocarbon solution of an organometallic compound, or a hydrocarbon soluble organometallic compound, a metallic constituent of which is selected from Groups I, II and III of the Periodic Chart of the Elements as in Fisher Scientific Company, Copyright 1952. Preferably, the organometallic compounds include those having the formula: $QR_n$ wherein Q is equal to the metallic constituent and is selected from Groups I–A, II and III having an atomic number of from 3 to 50 and $n$ is the valence state of Q and wherein R is the organic constituent and is selected from the group consisting of hydrogen or same or different, substituted or unsubstituted saturated or unsaturated alkyl, aryl, alkylaryl, arylalkyl or cycloalkyl groups containing up to about 20 carbon atoms. Representative, non-limiting examples of the organic constituents, i.e. R include, but are not limited to methyl, ethyl, n-propyl, isopropyl, isobutyl, secondary butyl, tertiary butyl, n-amyl, iso-amyl, heptyl, n-octyl, n-dodecyl and the like; 2-butyl, 2-methyl-2-butyl, and the like; cyclopentylmethyl, cyclohexylethyl, cyclohexylpropyl and the like; 2-phenylethyl, 2-phenylpropyl, 2-naphthylethyl, methylnaphthylethyl, and the like; cyclopentyl, cyclohexyl, 2,2,1-bicycloheptyl and the like; methylcyclopentyl, dimethylcyclopentyl, ethylcyclopentyl, methylcyclohexyl, dimethylcyclohexyl, 5-cyclopentadienyl and the like; phenylcyclopentyl, and the like, phenyl, tolyl, ethylphenyl, xylenyl, naphthyl, cyclohexylphenyl and the like. The more preferred metallic constituent of the organic metallic compound i.e. Q is selected from the group consisting of lithium, magnesium, beryllium, zinc, cadmium, mercury, boron aluminum, gallium and indium. In addition, organometallic compounds having the formula $QR_nX_m$ may be employed as the organometallic compound of the instant invention where Q and R are identical to the Q and R having been previously described, X is a halogen, and $n$ and $m$ are integers ranging from 1 to 3, the summation equal to the valence of Q.

The most preferred organometallic activating agents are the tri-alkyl substituted products of aluminum and the dialkyl halides of aluminum, particularly those containing alkyl groups having from one to about 6 carbon atoms, especially the linear alkyl groups. Exemplary of such compounds, which contain up to about 18 carbon atoms in the molecule, are trimethyl aluminum, triethyl aluminum, tri-n-butyl aluminum, tri-isobutyl aluminum, diethyl aluminum hydride, diethyl aluminum chloride, diethyl aluminum fluoride and the like. Certain volatile or hydrocarbon-soluble hydrides, for example, the various known hydrides of boron, are also suitable activating agents as well as are the Grignard reagents.

The treatment of the supported, heat-treated catalyst with the organometallic compound can be carried out with pure or diluted metal alkyl compounds in the liquid or vapor phase. Hydrocarbon diluents of the paraffinic, cyclo-paraffinic or aromatic types are entirely suitable. The metal alkyl compound may be present in concentrations of 5% to 50% in the diluent. A solution of about 20% aluminum triethyl in a paraffinic diluent is a preferred activation system. The activation reaction is quite exothermic and it may be desirable to remove the heat of activation. The temperature during the activation step, which is maintained in the range of from about 0° F. to about 500° F., preferably from about 100° F. to about 200° F. Considerable gas liberation occurs during activation and these gases are normally vented from the system. The activation is allowed to proceed until reaction is no longer observed, generally 0.5 hr. to 2 hrs. in contact with at least some excess of metal alkyl compound.

The treatment of the activated support material in order to obtain the most active and stable catalysts referred to above as the "fixation" step is a critical feature of the instant invention. After the support catalyst has been activated with the organometallic reducing agent, it is essential that the supported catalyst be treated in the presence of a gaseous stream containing hydrogen at a temperature of at least 300° F. in order to form the highly active, stable, novel heterogeneous catalyst of the instant invention. Preferably, the supported activated catalyst is treated in the presence of hydrogen at a temperature in the range of from about 300° F. to about 1200° F., more preferably from about 400° F. to about 1200° F. and still more preferably between about 800° F. and 1200° F. It is essential that this fixation treatment be conducted in the presence of a gaseous stream containing hydrogen. This fixation treatment can be carried out in the presence of nitrogen or inert gases such as helium, argon, and the like in view of the fact that hydrogen is formed "in situ" when these inert gases are employed. Necessarily, however, the fixation in the presence of nitrogen or inert gases such as helium, and argon will result in catalysts of lower activity than when the fixation step of the activated support catalyst is conducted totally in the presence of a hydrogen gas.

Although nitrogen is normally considered an inert gas, there is evidence that it may not be truly inert when present in the fixation of these catalyst systems. There is some evidence that gaseous nitrogen may react with the transition metal species at elevated temperatures. Such reaction which may form nitrides of the metals are obviously undesirable. Therefore, it is preferred that the fixation step be conducted at the above critical temperatures in the presence of a gaseous stream containing or resulting in the formation in the reaction zone of from about 5 to 100% hydrogen and more preferably from about 75 to about 100% hydrogen. Most preferably, the fixation under the above-described critical temperature conditions is conducted totally in the presence of a hydrogen atmosphere. As described above, it is believed that the function of hydrogen during the "fixation step" when the supported activated catalyst is treated under the critical temperature limitation described above, is to fix the catalyst in a stable heterogeneous form.

The fixation of the supported activated catalyst in the presence of a hydrogen gas under the above-described critical conditions is usually conducted over a period of time varying between about 1 to about 100 hours, generally less time being required at higher temperatures. As described above, it is quite surprising that under optimum conditions as described above, it can be shown that the activity of the catalysts of the instant invention increases as the length of time in which the supported activated catalyst is being treated in the presence of hydrogen at high temperatures, e.g., 800–1200° F. increases. This, again, is believed to be due to the fact that the instant invention results in completion of a series of reactions leading to a chemical bonding between the surface of the support and a very small crystallite of the transition metal and metal constituent of the organometallic compound such that these metals are not free to migrate on the surface of the catalyst and grow large crystallites. The formation of large crystallites in conventional supported catalyst is generally accepted as an important mode of catalyst deactivation. Thus, the catalyst of the instant invention are highly active at extremely mild hydrogenation conditions as well as exhibiting unusual stability at high severity conditions.

The fixation of the presence of hydrogen under the above-described temperature conditions can also be influenced by the hydrogen pressure at which such a treatment is conducted. Generally, atmospheric or near atmospheric pressure, from about 0.5 to about 1.5 atmospheres is employed. However, the hydrogen partial pressure may be increased in the reaction zone up to 100 atmospheres or greater. The hydrogen partial pressure will generally decrease the time-temperature requirements for forming the chemical bonding between the supports at a transition metal and metallic portion of the organometallic compounds.

The so-treated catalyst is then treated with hydrogen sulfide or a gaseous stream containing from about 1% to about 20% hydrogen sulfide, as described above, in order to form the sulfur-impervious hydrogenation catalyst of the instant invention, and may be further treated in hydrogen as described above to form the most active supported sulfided catalyst of the instant invention. The thus formed catalyst is then ready for contact with hydrogen or hydrogen-containing gases, a suitable reaction system for producing hydrogenation (or dehydrogenation) reactions. Olefins, whether singular or multiple linkage compounds, aliphatic or cyclic, and containing 2 to about 50 carbon atoms have been readily hydrogenated to paraffins, and aromatic compounds containing from 6 to about 50 carbon atoms, and more preferably from about 6 to about 30 carbon atoms have been saturated to produce the corresponding cycloalkane. Acetylenic compounds, whether singular or multiple linkage, aliphatic or cyclic in containing from about 2 to about 10 carbon atoms can also be hydrogenated by the catalyst of the instant invention. In fact, catalyst formed by the impregnation of the supports with aqueous salts of cobalt, and iron have proven highly satisfactory despite the normally low activity attributed to cobalt and the even lower activity attributed to iron for producing hydrogenation reactions.

The catalysts can be utilized as slurries or as fixed beds, movable beds and fluidized beds, in liquid phase or vapor phase, in batch, continuous or staged operations. Hydrogenation reactions can be carried out at remarkably low temperature and pressures as contrasted with the more conventional catalysts, whether the reaction is conducted in liquid phase or vapor phase. Hydrogenation reactions are generally conducted at temperatures ranging from about 0° F. to about 1000° F., and preferably at temperatures ranging from about 100° F. to about 500° F. The reactions can be conducted at lower than atmospheric pressure or at supra atmospheric pressures, but generally pressures ranging from as low as about 1 atmosphere to about 500 atmospheres can be employed. Preferably, however, pressures ranging from about 1 atmosphere to about 50 atmospheres are employed in conducting the reactions.

These catalysts are suitable for carrying out hydrogenation reactions in systems designed to handle high heats of reaction and severe contacting problems, without substantial deterioration and separation of catalyst from the support. This is due in large part to the high stability and activity of these catalysts, by virtue of which hydrogenation reactions can be conducted at very low hydrogen partial pressures ranging as low as from about 1 to about 200 atmospheres.

When it is desired to carry hydrogenation reactions essentially to completion, an excess of hydrogen over the stoichiometric requirement is used. This excess may vary from a few percent to several hundred or even several thousand percent. In the latter cases, these excess hydrogen is separated and recycled to the system. When it is desired to carry out partial hydrogenations, the reaction can be controlled on the basis of hydrogen concentration, e.g., mol ratio of $H_2$ to feed, or reaction kinetics, e.g., using an excess of hydrogen and controlling reaction by time, temperature, $H_2$ partial pressure and the like.

These and other features of the invention will be understood by reference to the following illustrative examples.

EXAMPLE 1

One hundred grams of F–1 activated alumina (Alcoa, 8–14 mesh) was impregnated with a solution prepared by dissolving 36 grams nickelous acetate (4 waters of hydration) in 156 grams water. After standing, the excess liquid was poured off and the catalyst dried in the vacuum oven at 300° F. The catalyst was impregnated a second time with the residual nickelous acetate solution. A small excess solution was poured off and the catalyst dried at 320° F. in the vacuum oven. The catalyst analyzed 3.4% nickel (calculated as metallic nickel).

Fifty grams of the catalyst was charged to a heated quartz tubular reactor and heated in a flow of dry nitrogen at 600° F. for approximately 1 hour. After cooling to room temperautre, the reactor was flooded from the bottom with a 20% solution of aluminum triethyl in toluene. The temperature reached a maximum of 140° F. and the solution was allowed to stay in the reactor for 1 hour. The liquid was drawn off and the catalyst was heated in a stream of dry nitrogen at 400–430° F. for 30 minutes to remove excess aluminum triethyl.

After cooling to room temperature, the catalyst was treated with hydrogen sulfide gas (about 10% $H_2S$ in 90% $N_2$ diluent). All $H_2S$ was absorbed by the catalyst for about the first 35 minutes after which time breakthrough of $H_2S$ occurred. The maximum temperature reached during the sulfiding operation was 140° F. The catalyst was then treated in a flow of hydrogen at 300–375° F. for 1 hour.

EXAMPLE 2

The catalyst prepared and activated in Example 1 was transferred to a one-liter Parr autoclave along with 300 cc. of a 50% solution of octene-1 in benzene. The mixture was hydrogenated at 390–395° F. and 800 p.s.i.g. $H_2$ pressure and samples withdrawn periodically and analyzed by vapor chromatography. Results are shown below:

| Time on conditions, hrs | 1 | 3 | 5 | 7 |
|---|---|---|---|---|
| Product analyses, percent: | | | | |
| Octane | 16.8 | 28.1 | 36.3 | 41.6 |
| Octene | 31.8 | 19.3 | 12.2 | 8.1 |
| Benzene | 51.4 | 52.6 | 51.5 | 50.3 |

The olefin was hydrogenated very selectively, with little or no hydrogenation of the benzene.

EXAMPLE 3

The unactivated nickel catalyst (50 gms.) prepared in Example 1, i.e., the catalyst as prepared prior to treatment with aluminum triethyl, was charged to the quartz tube and held at 600–635° F. while a stream of $H_2S$ was passed over the catalyst. Breakthrough of $H_2S$ occurred in about 30 minutes and the gas was changed to hydrogen and the catalyst cooled under hydrogen. The catalyst was used to hydrogenate at 50 percent solution of octene in benzene at 390–395° F. and 800 p.s.i.g. $H_2$ pressure with the following results:

| Time on conditions, hrs | 1 | 3 | 5 |
|---|---|---|---|
| Product analyses, percent: | | | |
| Octane | 4.6 | 8.5 | 12.9 |
| Octene | 43.4 | 39.8 | 36.3 |
| Benzene | 52.0 | 51.7 | 50.8 |

The catalyst in Example 2 had about five times the activity for olefin hydrogenation compared to the catalyst in Example 3.

EXAMPLE 4

A catalyst was prepared on F–1 alumina base containing about 5 percent cobalt (from cobalt acetate) and about 10 percent $MoO_3$ (from ammonium heptamolybdate). This catalyst was activated thermally and then with alumina triethyl as described in Example 1. Treatment with $H_2S$ in $N_2$ was also carried out as in Example 1, the maximum sulfiding temperature being 125° F. The final stripping of the catalyst was done with $H_2$ at 400° F. Results of hydrogenation of 50 percent octene in benzene at 390–395° F. and 800 p.s.i.g. $H_2$ pressure are shown below:

| Time on conditions, hrs | 1 | 3 | 5 |
|---|---|---|---|
| Product analyses, percent: | | | |
| Octane | 15.9 | 25.4 | 38.3 |
| Octene | 32.0 | 22.5 | 9.7 |
| Benzene | 52.1 | 52.0 | 52.0 |

This catalyst was thus approximately twice as active as the catalyst described in Example 2.

EXAMPLES 5-7

A commercial nickel-molybdena catalyst was activated with $H_2S$ at high temperature without prior aluminum alkyl treating, and at intermediate and low temperatures with aluminum alkyl pretreating. Activities of the catalysts were measured in terms of time required to hydrogenate half of the octene in octene-benzene mixtures at various temperatures and pressures.

| Example | 5 | 6 | | 7 | |
|---|---|---|---|---|---|
| AlEt₃ | None | Yes | | Yes | |
| Sulfiding temperature, °F. (max.) | 610 | 320 | | 65 | |
| Hydrogenation conditions: | | | | | |
| Temperature, °F | 350 | 395 | 350 | 212 | 212 |
| H₂ pressure | 800 | 800 | 800 | 400 | 400 |
| Time, hrs. estimated for 50 percent hydrogenation of olefin | 6.5 | 1.4 | 0.40 | 1.2 | 0.25 |

EXAMPLE 8

The catalyst used in Example 7 was used to hydrogenate steam cracked naphtha having a bromine number of 53 and containing about 200 p.p.m. sulfur. About 250 cc. naphtha feed was used with 50 cc. (35 grams) of catalyst in the stirred autoclave. Hydrogenation conditions and results are shown below:

| Hydrogenation conditions: | | |
|---|---|---|
| Temperature, °F | 212 | 300 |
| H₂ pressure, p.s.i.g. | 400 | 800 |

| Time, hr. | Br Number | Time, hr. | Br Number |
|---|---|---|---|
| 0.5 | 45 | 0.5 | 34 |
| 1.0 | 37 | 1.0 | 25 |
| 2.5 | 27 | 2.0 | 18 |
| | | 3.0 | 12 |

EXAMPLE 9

A commercial nickel-tungsten on alumina catalyst containing about 3 percent NiO and 17 percent $WO_3$ was thermally treated in dry nitrogen at 600° F., then activated with aluminum triethyl (max. temperature 175° F.) and freed of excess alkyl by stripping with dry nitrogen at 400° F.

The catalyst was transferred to a tube which was cooled in ice and the catalyst was sulfided (about 10 percent $H_2S$ in $N_2$) at a maximum temperature of 75° F. until $H_2S$ broke through.

The catalyst (40 grams) was charged with 200 cc. of benzene to a one-liter stirred autoclave. Hydrogenation was carried out at 390-395° F. and 800 p.s.i.g. $H_2$ pressure. The benzene was hydrogenated at a rate of about 3 percent per hour.

EXAMPLE 10

The catalyst used in Example 9 was used to hydrogenate the steam cracked naphtha under the conditions and with the results shown.

| Hydrogenation conditions: | | |
|---|---|---|
| Temperature, °F | 250 | 300 |
| H₂ pressure, p.s.i.g. | 800 | 800 |

| Time, hr. | Br Number | Time, hr. | Br Number |
|---|---|---|---|
| 0.5 | 45 | 0.5 | 25 |
| 1.0 | 38 | 1.0 | 15 |
| 2.0 | 32 | 2.0 | 9 |
| 3.0 | 28 | | |

In hydrogenating steam cracked naphthas it is desired to carry out the hydrogenation at as low temperatures as possible to avoid contamination of the catalyst with polymeric materials. It is normally not necessary or desirable to completely hydrogenate the naphtha. At a bromine number of about 30, using the catalysts described, practically all of the severe gum-forming materials have been eliminated.

EXAMPLES 11-12

Tungstic acid, 400 grams, was mixed with nickel carbonate, 96 grams, and the dry mixture was ball milled for one hour, and then heated at 700° F. overnight. The mixture was pelletized, broken and screened to 14-35 mesh.

A portion, 42 grams, of the above catalyst was sulfided in a heated quartz tube first at 500° F., then at 700° F. for a total of 9 hours, using $H_2S$ in nitrogen (about 20 percent $H_2S$).

Another portion (46 grams) of the catalyst was heated at 600° F. in dry $N_2$, then activated with aluminum triethyl solution in the manner previously described (max. temperature 175° F.). The catalyst was then freed of excess aluminum triethyl by stripping with dry $N_2$ at 400° F. Sulfiding was carried out in a separate tube cooled in ice. The maximum temperature during sulfiding was 73° F.

The hydrogenation of olefin (octene) in benzene solution was found to follow first order kinetics. First order rate constants are shown below for the two catalysts described above for hydrogenation of 50 percent octene in benzene at 8/1 vol. ratio of feed/catalyst and 800 p.s.i.g.

| AlEt₃ activation | No | | Yes | |
|---|---|---|---|---|
| Sulfiding temperature, °F | 500-700 | | 73 | |
| First order olefin hydrogenation rate constant at, temp., °F | 390 | 480 | 300 | 390 |
| | 0.10 | 0.96 | 0.30 | 1.6 |

EXAMPLE 13

A commercial nickel-tungsten on alumina catalyst containing about 3.5% NiO and about 17% $WO_3$ was thermally treated in dry nitrogen at a temperature of 800° F. and then activated with aluminum triethyl. The activated supported catalyst was then treated in hydrogen at 800° F. and then sulfided with $H_2S$ at 400° F. Thereafter, the sulfided catalyst was treated in hydrogen at 400° F. for 1 hour (Run A) and in hydrogen at 900° F. for 1 hour (Run B).

First order rate constants are shown below for the two catalysts (Run A and Run B) described above for the hydrogenation of octene-1 600 p.s.i.g.

| | Temp., °F. | Gaseous atmosphere | First order olefin hydrogenation rate constant at temp.° F. | |
|---|---|---|---|---|
| Run A | 400 | Hydrogen | 0.087 | 30 |
| Run B | 900 | do | 0.55 | 12 |

Run B clearly shows that "stripping" the sulfided catalyst at high temperatures in presence of hydrogen results in a highly active catalyst under extremely mild conditions.

EXAMPLE 14

The catalyst from Run A of Example 13 was placed back in the activation tube and was treated in nitrogen at 900° F. for one hour and was then tested again for hydrogenation of octene-1. The activity (rate constant) at 212° F. was 0.06%/hr. This catalyst was therefore not significantly improved in activity by the high temperature nitrogen treatment.

What is claimed is:
1. A process for forming a hydrogenation catalyst which comprises:
   impregnating the support containing at least 0.1 millimole of hydroxyl groups per gram of support with an aqueous solution of a salt of a transition metal wherein the transition metal is selected from the group consisting of Groups I-B, IV-B, V-B, VI-B, VII-B, and Group VIII metals and mixtures thereof;

heat-treating the impregnated support at a temperature of at least about 500° F. to remove liquid and adsorbed oxygen;

activating the heat-treated impregnated support by contacting same with a predominantly co-valently bonded organometallic compound having the formula: $QR_n$ wherein Q is selected from Groups I, II and III metals of the Periodic Chart of the Elements, R is selected from the group consisting of hydride and, alkyl, aryl, alkaryl, aralkyl, or cycloalkyl radicals containing up to about 20 carbon atoms and wherein $n$ ranges from 1 to 3 and satisfies the valence of Q;

treating the activated supported metal complex in the presence of hydrogen at a temperature of a least about 300° F.; and thereafter;

contacting the hydrogen-treated activated supported metal complex with hydrogen sulfide at a temperature of up to about 1000° F.

2. The process of claim 1 wherein the support is selected from oxides of Groups II, III and IV of the Periodic Chart of the Elements.

3. The process of claim 1 wherein Q has an atomic number of from 3 to 50 and wherein $QR_n$ is a tri-alkyl aluminum.

4. The process of claim 1 wherein the hydrogen-treated activated supported metal complex is treated with hydrogen sulfide at temperatures in the range of from about 100 to about 800° F.

5. The process of claim 1 wherein the hydrogen sulfide is contained in a gaseous stream in a concentration ranging from about 0.1 to about 20%.

6. A process for forming a sulfided hydrogenation catalyst which comprises:

impregnating a support having a surface area of at least 5 square meters per gram and containing at least 0.1 millimole of hydroxyl groups per gram of support in an aqueous solution of a salt of a transition metal wherein the transition metal is selected from the group consisting of Groups I-B, IV-B, V-B, VI-B, VII-B, and Group VIII metals and mixtures thereof;

heat-treating the impregnated support in an inert atmosphere at a temperature of at least about 500° F.;

activating the heat-treated impregnated support by contacting the same with predominantly co-valently bonded organometallic compound having the formula: $QR_n$ wherein Q is selected from Groups I, II and III metals of the Periodic Chart of the Elements having an atomic number of from 3 to 50, R is and is selected from the groups consisting of hydride, and alkyl, aryl, alkaryl, aralkyl and cycloalkyl radicals having up to about 20 carbon atoms, and wherein $n$ ranges from 1 to 3 and satisfies the valence of Q;

heating the activated supported metal complex in the presence of hydrogen at a temperature of at least about 300° F.; and thereafter contacting the hydrogen treated activated supported metal complex with a gaseous stream containing hydrogen sulfide at a temperature of up to about 1000° F.

7. The process of claim 6 wherein the support is selected from oxides of Groups II, III and IV of the Periodic Chart of the Elements.

8. The process of claim 6 wherein the amount of transition metal impregnated on the support is in the range of from 0.1 to about 30% based on the total weight of the deposited equivalent metal and support.

9. The process of claim 6 wherein the heat-treated impregnated support is activated by contacting the same with a hydrocarbon solution of a tri-alkyl aluminum wherein the alkyl groups contain from 1 to about 6 carbon atoms.

10. The process of claim 6 wherein the concentration of the hydrogen sulfide in the gaseous stream containing hydrogen sulfide is in the range of from about 1 to about 20%.

11. The process of claim 6 wherein the hydrogen treated activated supported metal complex is treated with hydrogen sulfide at a temperature in the range of from about 100 to about 800° F.

12. A process for forming a sulfided hydrogenation catalyst which comprises:

impregnating a support having a surface area of at least 5 square meters per gram and containing at least about 0.1 millimole of hydroxyl groups per gram of support with an aqueous solution of a salt of a transition metal wherein the transition metal is selected from the group consisting of Groups I-B, IV-B, V-B, VI-B, VII-B, and Group VIII metals and mixtures thereof;

heat-treating the impregnated support in an inert atmosphere at a temperature of at least about 500° F.;

activating the heat-treated impregnated support by contacting the same with a hydrocarbon soluble organometallic compound having the formula: $QR_n$ wherein Q is selected from Groups I, II and III metals of the Periodic Chart of the Elements having an atomic number of from 3 to 50, R is selected from the group consisting of hydride and, alkyl, aryl, alkaryl, aralkyl and cycloalkyl radicals containing up to about 20 carbon atoms, and $n$ ranges from 1 to 3 and satisfies the valence of Q;

treating the activated supported metal complex in the presence of hydrogen at a temperature of at least about 300° F.;

contacting the hydrogen treated activated supported metal complex with a gaseous stream containing hydrogen sulfide at a temperature of up to about 1000° F.;

thereafter treating the sulfided supported metal complex with a gaseous stream containing hydrogen at a temperature above 400° F.

13. The process of claim 12 wherein the support is selected from the oxides of Groups II, III and IV of the Periodic Chart of the Elements.

14. The process of claim 12 wherein the amount of transition metal impregnated on the support is in the range of from about 0.1% to about 30% based on the total weight of the deposited equivalent metal and support.

15. The process of claim 12 wherein the heat-treated impregnated support is activated by contacting the same with a hydrocarbon solution of a tri-alkyl aluminum wherein the alkyl groups contain from 1 to about 6 carbon atoms.

16. The process of claim 12 wherein the concentration of hydrogen sulfide in the gaseous stream containing hydrogen sulfide is in the range of from about 0.1 to about 20%.

17. The process of claim 16 wherein the hydrogen treated activated supported metal complex is contacted with hydrogen sulfide at a temperature in the range of from about 100 to about 800° F.

18. The process of claim 12 wherein the sulfided supported metal complex is treated in a hydrogen atmosphere at a temperature in the range of from about 400 to about 1200° F.

19. The process of claim 18 wherein the hydrogen treated sulfided activated supported metal complex is treated in a hydrogen atmosphere at a temperature above 600° F.

20. The process of claim 12 wherein the sulfided hydrogen treated activated supported metal complex formed by contacting the hydrogen treated activated support metal complex with hydrogen sulfide at a temperature of up to about 1000° F., is contacted with a gaseous stream containing hydrogen at a temperature in the range of from about 400 to about 1200° F.

21. The process of claim 20 wherein the sulfided catalyst is heated in a hydrogen atmosphere at a temperature above 600° F.

References Cited

UNITED STATES PATENTS

| | | | |
|---|---|---|---|
| 2,145,657 | 1/1939 | Ipatirff | 196—24 |
| 2,875,158 | 2/1959 | Winstrom | 252—439 |
| 3,153,678 | 10/1964 | Logemann | 260—667 |
| 3,536,632 | 10/1970 | Kroll | 252—430 |
| 3,415,759 | 12/1968 | Johnson | 252—455 |
| 3,113,931 | 12/1963 | Voltz | 252—442 |
| 3,288,725 | 11/1966 | Aftandilian | 252—447 |
| 3,221,002 | 11/1965 | Orzechowski | 260—94.9 |
| 3,205,178 | 9/1965 | Orzechowski | 252—429 |

DANIEL E. WYMAN, Primary Examiner

P. M. FRENCH, Assistant Examiner

U.S. Cl. X.R.

252—430, 429, 428